United States Patent
Snider

(10) Patent No.: US 8,798,587 B2
(45) Date of Patent: Aug. 5, 2014

(54) SYSTEMS AND METHODS FOR USING TWO OR MORE SUBSCRIBER IDENTIFICATION MODULE CARDS IN TELEMATICS APPLICATIONS

(75) Inventor: James Snider, Kildeer, IL (US)

(73) Assignee: Continental Automotive Systems, Inc, Auburn Hills, MI (US)

(*) Notice: Subject to any disclaimer, the term of this patent is extended or adjusted under 35 U.S.C. 154(b) by 403 days.

(21) Appl. No.: 13/029,296

(22) Filed: Feb. 17, 2011

(65) Prior Publication Data

US 2012/0214450 A1 Aug. 23, 2012

(51) Int. Cl.
*H04M 3/42* (2006.01)

(52) U.S. Cl.
USPC ............ 455/414.1; 455/418; 455/456.3; 455/422.1; 455/433; 455/406; 455/426.1; 455/415; 455/432.1

(58) Field of Classification Search
USPC .......... 455/418, 456.3, 422.1, 433, 558, 406, 455/67.11, 414.1, 404.1, 41.2, 466, 416, 455/427, 432.2, 423, 426.1, 415, 432.1, 455/404.2, 414.2, 445
See application file for complete search history.

(56) References Cited

U.S. PATENT DOCUMENTS

| | | | | |
|---|---|---|---|---|
| 8,364,183 B2* | 1/2013 | Olincy et al. | ................. | 455/466 |
| 8,374,626 B2* | 2/2013 | Jun et al. | ..................... | 455/456.1 |
| 8,385,956 B2* | 2/2013 | Sennett et al. | ................. | 455/466 |
| 2003/0136827 A1* | 7/2003 | Kaneko et al. | ................. | 235/375 |
| 2011/0193718 A1* | 8/2011 | Chevrette et al. | ........ | 340/870.02 |
| 2012/0009937 A1* | 1/2012 | Daly | .......................... | 455/456.1 |
| 2012/0015622 A1* | 1/2012 | Kuz et al. | ................... | 455/404.2 |
| 2013/0060869 A1* | 3/2013 | Davis et al. | ................... | 709/206 |

FOREIGN PATENT DOCUMENTS

| | | |
|---|---|---|
| WO | 00/41409 A2 | 7/2000 |
| WO | 01/43460 A2 | 6/2001 |
| WO | 2009/095354 A2 | 8/2009 |

OTHER PUBLICATIONS

International Search Report dated Mar. 29, 2012, from corresponding International Patent Application No. PCT/US2012/023141.

* cited by examiner

*Primary Examiner* — Joseph Arevalo

(57) ABSTRACT

A system for providing access to a telematics service provider has a network access device and an antenna in communication with the network access device. The antenna provides wireless communication between the processor and the telematics service provider. A processor of the network access device is configured to send an equipment identifier and a subscriber identifier of a network access device to the a telematics service provider, send an equipment identifier of the network access device and the subscriber identifier of a secondary device to the telematics service provider, and determine if data received from the telematics service provider is to be processed by the processor of the network access device or the secondary device.

19 Claims, 2 Drawing Sheets

SYSTEMS AND METHODS FOR USING TWO OR MORE SUBSCRIBER IDENTIFICATION MODULE CARDS IN TELEMATICS APPLICATIONS

BACKGROUND

1. Field of the Invention

The invention generally relates to systems and methods for using two or more Subscriber Identification Module (SIM) cards in telematics applications.

2. Description of Related Art

Some mobile telephony systems, such as Global System for Mobile Communications (GSM) utilize a SIM card. The SIM card is a removable smart card containing a user's subscription information and phone book. This allows the user to retain their information after switching mobile devices that utilize the SIM card. Additionally, the user can also change mobile operators while retaining the mobile device by simply changing the SIM card to a SIM card that is associated with a different mobile operator.

This plug and play system allows users to utilize different mobile devices using a single account. For example, assume a user buys a new mobile device, such as a mobile phone, to replace an older mobile phone. In order to activate the new mobile phone, the user simply places the SIM card from the old mobile phone into the new mobile phone, and the newer mobile phone is ready for use. Any activity the user has with the new mobile phone will be associated with their account and the user will be billed accordingly.

This is not only useful when buying new equipment, but certain mobile telecommunications operators charge different rates at different times of the day. By allowing the user to simply switch SIM cards in their mobile device, the user can utilize the SIM card from the mobile operator that has the best rates at any given time. If a first mobile operator has better rates during the day and a second mobile operator has better rates during the night, the user can simply utilize the SIM card associated with the first mobile operator during the day and then use the second SIM card associated with the second operator during the night.

With regard to automotive telematics, the telematics system of the automobile may also utilize a SIM card, so that the driver of the automobile can access telematics features from a telematics service provider associated with the SIM card. If the driver of the automobile wishes to utilize another SIM card with the telematics units, such as a SIM card used with the driver's mobile telephone, the driver would have to replace the SIM card of the telematics system with the SIM card of the mobile phone. While this would allow the telematics device of the automobile to make telephone calls, as well as, send and receive other types of communication, the telematics service provider will not be able to communicate with the telematics device because that SIM card that is associated with the telematics service provider has been replaced with the mobile telephone's SIM card. This prevents the telematics service provider from communicating with the telematics device and will minimize the use of the telematics device by the driver, as it is common for the telematics service providers to offer advanced features that mobile phone operators generally do not offer. These advanced features can include the ability to lock and unlock the doors of the automobile, vehicle security features, vehicle navigation features, and numerous other enhancements.

SUMMARY

A system and method for providing access to a telematics service provider has a network access device and an antenna in communication with the network access device. The antenna provides wireless communication between the processor and the telematics service provider. A processor of the network access device is configured to send an equipment identifier and a subscriber identifier of a network access device to the telematics service provider, send an equipment identifier of a secondary device and the subscriber identifier of the network access device to the telematics service provider, and determine if data received from the telematics service provider is to be processed by the processor of the network access device or the secondary device.

Further objects, features and advantages of this system and method will become readily apparent to persons skilled in the art after a review of the following description, with reference to the drawings and claims that are appended to and form a part of this specification.

DETAILED DESCRIPTION

Figure 1:
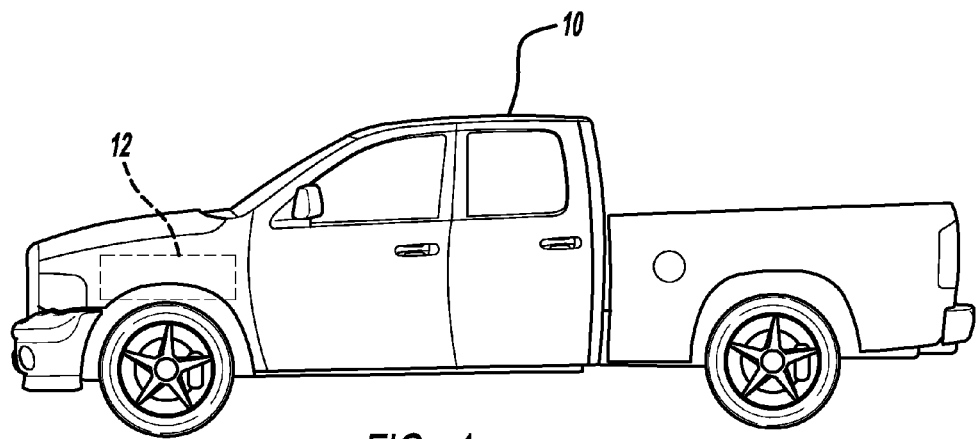
FIG. 1 illustrates a system for providing access to a telematics service provider via a network access device.

Referring to FIG. 1, an automobile 10 incorporating a system 12 for accessing a telematics service provider via a network access device is shown. It should be understood that the automobile 10 can be any type of vehicle, such as a car, truck, sport utility vehicle, tractor trailer, and even aircraft and watercraft.

Figure 2:
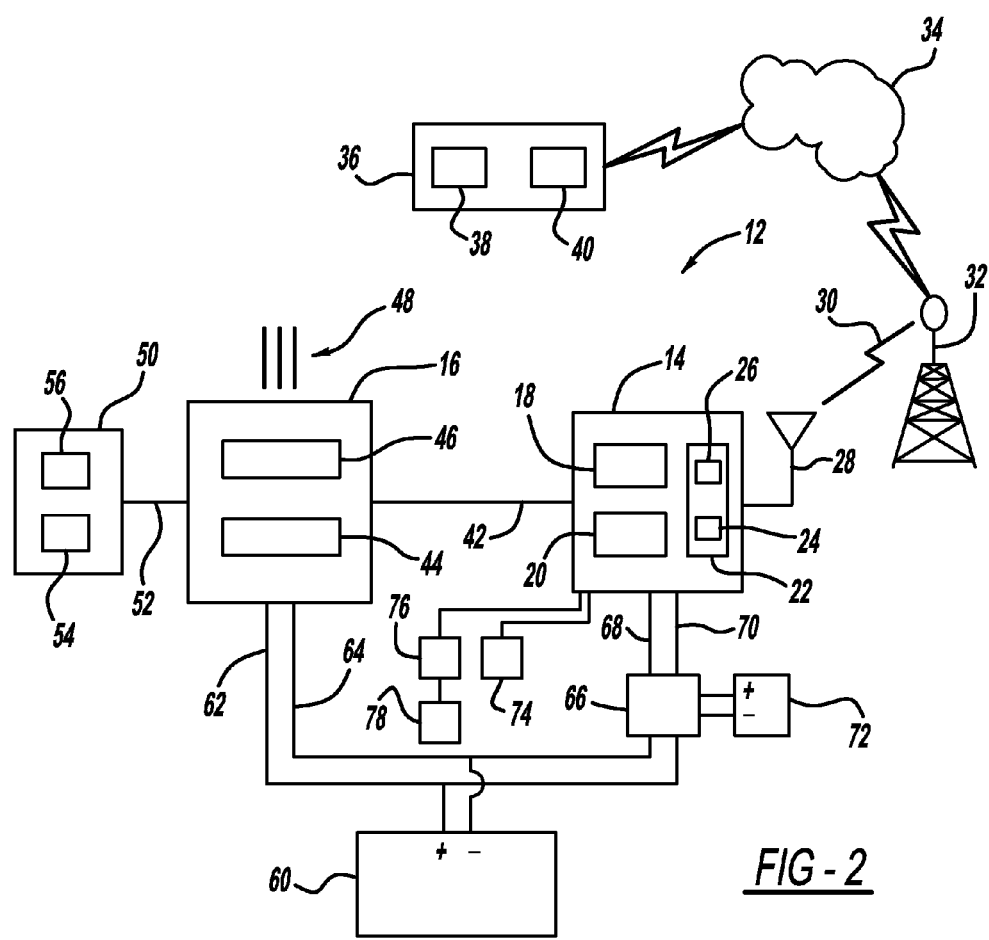
FIG. 2 illustrates a more detailed view of the system for providing access to a telematics service provider via a network access device.

Referring to FIG. 2, a more detailed illustration of the system 12 is shown. The system 12 includes a network access device 14 and a telematics controller 16. The network access device 14 may include a processor 18 and storage 20. The processor 18 may be a programmable microprocessor or alternatively may be an application specific integrated circuit, or other known processor. The storage 20 may be a memory, for example, random access memory, static memory, or other data storage device. The network access device 14 may also include a transceiver 22 which includes a transmitter 24 and a receiver 26. Alternatively, the network access device 14 may include an independent transmitter and receiver. The transceiver 22 may be in communication with an antenna 28. The transceiver 22 may communicate with a radio tower 32, as denoted by line 30. The communication 30 between the network access device 14 and the radio tower 32 may comprise one of a plurality of communication modes.

The transceiver 24 in the network access device 14 may be used for transmitting up link communications and receiving down link communications to and from a network 34 and a telematics service provider 36 over the wireless communication link 30. The wireless communication link 30 may use a wireless protocol such as a standard cellular network protocol such as GSM and the like. To transmit data in the cellular environment, different types of standard bare services exist including, but not limited to, General Packet Radio Service (GPRS), Short Message Service (SMS), Circuit Switch Data Service (CSD), and High Speed Switched Data Service (HSSD). Further, Standard Transmission Control Protocol/Internet Protocol (TCP/IP) may be used as well as satellite communications.

The radio tower 32 may be in communication with the telematics service provider 36, including for example, a network server through a network 34. The network 34 may be an analog network such as a plain old telephone service (POTS) or a digital network for example, Ethernet over transmission control protocol/internet protocol. In other examples, the network 34 could be a satellite based network, a public switch telecommunications network, the internet, and integrated services digital network, and/or other communication networks.

The telematics service provider 36 may include a service center to perform telematics applications and services to the automobile. For instance, the service center may contain operators, content servers, and content data bases. The content servers for telematics applications and services may include traffic servers, map servers, user profile servers, location information servers, and the like. The content data bases for telematics applications and services may include location information, user profiles, traffic content, map content, point of interest content, usage history, and the like. As such, the telematics service provider 36 may include one or more servers having a processor 38 and a memory 40. The network access device 18 may be in communication with the telematics controller 16 through a communication interface 42. In some implementations, the network access device 18 may be in the same package as the telematics controller 16. However, other implementations of the network access device 14 may be provided in a separate package from the package of the telematics controller 16 and, therefore, may be located in different areas of the automobile.

Various information may be communicated between the telematics controller 16 and the network access device 14. The telematics controller 15 may include a processor 44 and a memory 46. The processor 44 may be a microprocessor, an application specific integrated circuit, a programmable gate array, or other processor. Further, the storage 46 may be a memory device for example, random access memory, read only memory, static memory, or may even be a hard drive or optical drive, or other means of data storage. The telematics controller 16 may be in communication with a plurality of other vehicle sensors and devices through a wire harness or over the vehicle bus, as denoted by lines 48. In addition, the telematics controller 16 may be in communication with the user interface 50, as denoted by line 52. The user interface 50 may include a display 56 and controls 54 for providing user input such as vehicle parameters into the telematics controller 16. Also, the user interface 50 may include elements such as a keyboard, a keypad, one or more control buttons, indicator lights, one or more speakers, a microphone, or any other user interface type elements for telematics applications and services. Optionally, the telematics controller 16 may also be connected to a positioning unit. The positioning unit could be a system that determines geographic location of the automobile such as a global positioning system (GPS) or similar device Further, the telematics controller 16 may be in communication with other vehicle systems such as an engine control system, the vehicle lock controls, the vehicle safety systems, vehicle entertainment system, or suspension control system to implement the described functions of the telematics controller 16 or the network access device 14 based on parameters of such systems.

The telematics controller 16 may be powered by the vehicle battery 60, as denoted by lines 62 and 64. Alternatively, a voltage converter may be provided to convert from the vehicle battery voltage to a different voltage that may be appropriate from running the telematics controller 16. The voltage converter may be included in the package for the telematics controller 16 or alternatively may be in a separate package between the vehicle battery 60 and a telematics controller 16. The vehicle battery 60 may also provide power to the network access device 14. A circuit 66 may be included between the vehicle battery 60 and the network access device 14. The circuit 66 may include a voltage converter to change the voltage provided to the network access device 14 through lines 68 and 70.

In addition, the circuit 66 may be connected to a network access battery device 72. The network access battery device 72 may be changed while the automobile is running and may for example, be switched to provide power to network access device 14 when the power from the vehicle system is not available. Further, the circuit 66 may control the monitoring and periodic powering of the network access device 14 if the automobile is turned off for a long period of time. Further, the circuit 66 may control the charging of the network access device battery 72 at appropriate times according to the environmental variables or the expected use cycle of the vehicle. In order to access telematics service provider 36 via the network 34, the network access device 14 will likely utilize a SIM card 74. The SIM card provides a subscriber identity to the telematics service provider 36, enabling the network access device 14 to receive services from the telematics service provider 36.

Additionally, the network access device 14 can also be in communication with the secondary device 76 that may be a mobile device. The secondary device 76 may have a SIM card 78, which allows the secondary device 76 to communicate with the telematics service provider 36. It should be understood that the SIM card 78 of the secondary device 76 may be in communication with the network access device 14 either directly, or via the secondary device 76 as shown. For example, the network access device 14 may be in communication with a card reader that can directly read the SIM card 78 or may be in communication either wired or wirelessly with the secondary device 76 and therefore the SIM card 78.

Figure 3:
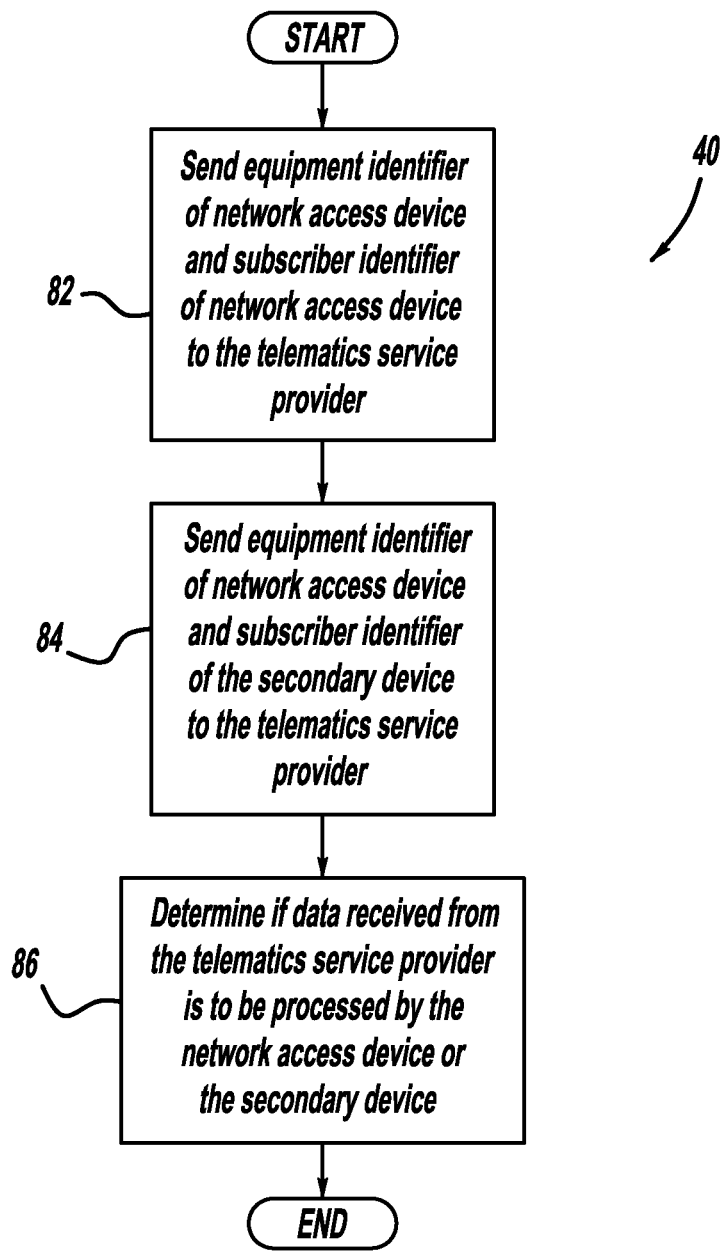
FIG. 3 illustrates a method for providing access to the telematics service provider via the network access device.

Referring to FIG. 3, a method 80 for allowing the network access device to utilize the SIM card 78 of the secondary device 76 as shown. Reference will be made that the system 12 of FIG. 2 when describing the method 80. The method 80 may be incorporated in a computer readable storage medium having stored therein instructions executable by a programmed processor.

The method begins with step 82, wherein the network access device 14 sends an equipment identifier of the network access device 14 and the subscriber identifier of the network access device 14 to a telematics service provider 36. The equipment identifier and the subscriber identifier of the network access device may be both stored on the SIM card 74 of the network access device 14. However, the equipment identifier may also be stored on the memory 20 of the network access device 14.

When the user brings a secondary device 76, such as a mobile device into the vehicle, the network access device 14 may mate with secondary device 76 and take on the identity of that secondary device 76. More specifically, the network access device 14 will use the subscriber identifier of secondary device 76 and not the subscriber identifier of the network access device 14. Any calls made are billed to the account associate with the SIM card 78 of the secondary device 76 rather than the SIM card 74 of the network access device 14 even though the network access device 14 hardware is being used.

In step 84, the network access device sends the equipment identifier of the network access device 14 and the subscriber identifier of the secondary device 76 to the telematics service provider 36. The subscriber identifier of the secondary device 76 is stored on the SIM card 78 of the secondary device 76.

The telematics service provider 36 stores both the subscriber identifier and equipment identifier of the network access device 14. This can be performed on first time activation of the network access device 14. Subsequently during every registration after, the telematics service provider 36 may check the current subscriber identifier and equipment identifier that is sent from the network access device 14. If the current subscriber identifier does not match the originally stored subscriber identifier, then the telematics service provider 36 can determine that the network access device 14 is using another SIM card, such as SIM card 78. The telematics service provider 36 can still contact the network access device 14, but the network access device 14 needs to use the personal SIM account of the SIM card 78.

In step 86, the network access device 14 determines if data received from the telematics service provider 36 is to be processed by the network access device 14 or the secondary device 76. Essentially, the network access device 14 looks at the data that is received from the telematics service provider 36 and determines if the data is flagged in such a way so as to indicate that the data is meant for the network access device or the secondary device 76. If data is meant to be processed by the network access device 14, the processor 18 of the network access device 14 processes that data and performs the necessary services. If the network access device 14 determines otherwise, the data is then sent to the secondary device 76 for processing.

For example, assume that the secondary device 76 is a mobile phone and a telephone call for the secondary device 76 is sent from the telematics service provider 36 to the network access device 14. The network access device 14 determines that this data is meant to be processed by the secondary device 76 and sends the data to the secondary device 76. In like manner, if the telematics service provider 36 sends a signal to unlock the doors of the automobile containing the system 12, the network access device will receive this data and then determine that it should be processed by the processor 18 and not by the secondary device 76. By so doing, this allows the secondary device to be mated with the network access device 14 but does not require a separate external antenna for the secondary device to improve communicate with the telematics service provider 36 or a separate hands free vehicle kit to improve driver awareness. Here, the secondary device 76 can mate with the network access device 14 and utilize the antenna and hardware 28 of the network access device to communicate with the telematics service provider 36.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

I claim:

1. A method for providing access to a telematics service provider via a network access device located in an automobile, a network access device comprising a radio frequency transmitter and a radio frequency receiver, which are configured to communicate with a wireless communications network using wireless communication links, the method comprising the steps of:

wirelessly sending to the telematics service provider, an equipment identifier and a primary subscriber identifier obtained from a primary network access device located in the automobile, the primary network access device being coupled to a telematics controller for the automobile through a communication interface for the automobile;

wirelessly sending to the telematics service provider, an equipment identifier of the primary network access device and a secondary subscriber identifier obtained from a secondary network access device also located in the automobile, the secondary network access device being a mobile phone; and determining if data received from the telematics service provider is to be processed by the primary network access device or the secondary network access device.

2. The method of claim 1, further comprising the steps of determining if data received from the telematics service provider is flagged, flagging indicating that data received from the telematics service provider is to be processed by one of the primary network access device and the secondary network access device.

3. The method of claim 2, further comprising the step of processing data by the one of the primary and secondary network access devices, responsive to said flagging.

4. The method of claim 3, further comprising the step of processing data by the secondary network access device if the data received from the telematics service provider is unflagged.

5. The method of claim 1, wherein the primary subscriber identifier is obtained from a first subscriber identification module coupled to the primary network access device and wherein the secondary subscriber identifier is obtained from a second subscriber identification module coupled to the secondary network access device.

6. In a non-transitory computer readable storage medium having stored therein instructions executable by a programmed processor, configured to provide access to a telematics service provider via a network access device located in an automobile, a network access device comprising a radio frequency transmitter and a radio frequency receiver, which are configured to communicate with a wireless communications network using wireless communication links, the storage medium comprising instructions for:

wirelessly sending to the telematics service provider, an equipment identifier of a primary network access device and a subscriber identifier of the primary network access device, the primary network access device being located in the automobile and being coupled to a telematics controller for the automobile through a communications interface;

wirelessly sending to the telematics service provider an equipment identifier of the primary network access device and a secondary subscriber identifier obtained from a secondary network access device also located inside the automobile, the secondary network access device being a mobile phone; and determining if data received from the telematics service provider is to be processed by the primary network access device or the secondary network access device.

7. The computer readable storage medium of claim 6, further comprising the steps of determining if data received from the telematics service provider is flagged, flagging indicating that data received from the telematics service provider is to be processed by one of the primary network access device and the secondary network access device.

8. The computer readable storage medium of claim 7, further comprising the step of processing data by one of the primary network access device and secondary network access device responsive to said flagging.

9. The computer readable storage medium of claim 8, further comprising the step of processing data by the secondary network access device if the data received from the telematics service provider is unflagged.

10. The computer readable storage medium of claim 6, wherein the secondary network access device is a mobile device.

11. The computer readable storage medium of claim 6, wherein the secondary network access device further comprises a subscriber identification module.

12. A system for providing access to a telematics service provider from a vehicle having a telematics controller, a network access device comprising a radio frequency transmitter and a radio frequency receiver configured to communicate with a wireless communications network using wireless communications links, the system comprising:
 a primary network access device having a first processor, the primary network access device being coupled to the telematics controller through a communications interface and having a first subscriber identifier that is stored in a first subscriber identity card that is operatively coupled to the primary network access device;
 an antenna in communication with the primary network access device for providing wireless communication between the first processor and the telematics service provider;
 the first processor being configured to send to a telematics service provider:
  an equipment identifier and the first subscriber identifier of the primary network access device;
  send an equipment identifier of the primary network access device and send a second subscriber identifier of a mobile phone located in the vehicle, the mobile phone having a second, subscriber identity card wherein said second subscriber identifier is stored,
 the first processor being additionally configured to:
  determine if data received from the telematics service provider is to be processed by the first processor of the primary network access device or a second processor of the mobile phone.

13. The system of claim 12, wherein the first processor is further configured to determine if data received from the telematics service provider is flagged to indicate that data received from the telematics service provider is to be processed by one of the primary network access device or the mobile phone.

14. The system of claim 13, wherein the first processor is further configured to process data if the data received from the telematics service provider is flagged to indicate that data received from the telematics service provider is to be processed by one of the primary network access device or the mobile phone.

15. The method of claim 14 wherein the first processor is further configured to allow the mobile phone to process data if the data received from the telematics service provider is unflagged.

16. The system of claim 12, further comprising a card reader in communication with the first processor, wherein the card reader is configured to receiver a subscriber identification module of the mobile phone, the subscriber identification module having information relating the subscriber identifier of the mobile phone.

17. A system for providing access to a telematics service provider, the system comprising:
 a primary network access device comprising a first radio frequency transmitter, a first radio frequency receiver and a first processor, the primary network access device being configured to communicate with a wireless communications network;
 an antenna in communication with the first radio frequency transmitter and a first radio frequency receiver, the antenna facilitating wireless communication between the first processor and the telematics service provider;
 a card reader in communication with the first processor, wherein the card reader is configured to receiver a subscriber identification module of a mobile phone, the subscriber identification module of the mobile phone having a subscriber identifier of the mobile phone, the first processor being configured to send to the telematics service provider, an equipment identifier and a subscriber identifier of a primary network access device send the equipment identifier of the primary network access device and the subscriber identifier of mobile phone, to the telematics service provider, and determine if data received from the telematics service provider is to be processed by the first processor of the primary network access device or the mobile phone;
 wherein the first processor is further configured to determine if data received from the telematics service provider is flagged to indicate that data received from the telematics service provider is to be processed by one of the primary network access device or the mobile phone.

18. The system of claim 17, wherein the first processor is further configured to process data if the data received from the telematics service provider is flagged to indicate that data received from the telematics service provider is to be processed by one of the primary network access device or the mobile phone.

19. The method of claim 17 wherein the first processor is further configured to allow the mobile phone to process data if the data received from the telematics service provider is unflagged.

* * * * *